April 4, 1967  J. F. SEBALD  3,312,274
CALORIMETER FOR MEASURING FOULING RESISTANCE
OF A SURFACE CONDENSER TUBE
Filed April 16, 1964  2 Sheets-Sheet 1

JOSEPH F. SEBALD
INVENTOR.

BY Daniel A. Bobis
atty

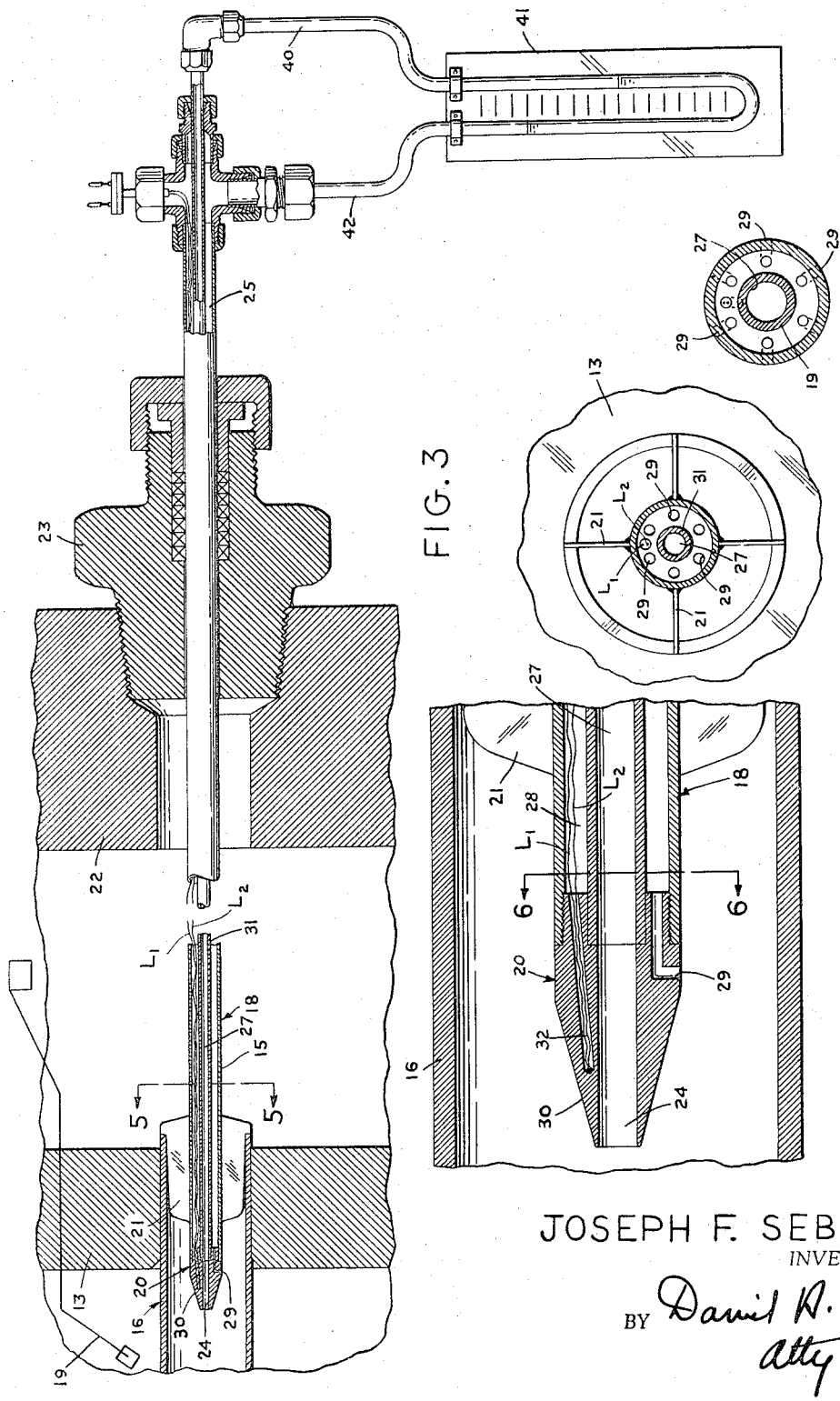

United States Patent Office 3,312,274
Patented Apr. 4, 1967

3,312,274
CALORIMETER FOR MEASURING FOULING RESISTANCE OF A SURFACE CONDENSER TUBE
Joseph F. Sebald, Bloomfield, N.J., assignor to Worthington Corporation, Harrison, N.J., a corporation of Delaware
Filed Apr. 16, 1964, Ser. No. 360,390
8 Claims. (Cl. 165—1)

The present invention relates to surface condensers of the steam or vapor type and more particularly to means forming a minimum number of calorimeter tubes which permit the accurate determination of the fouling resistance characteristic of condenser tubes in service.

Prior art methods for determining such fouling resistance characteristics comprise withdrawing tubes from the condenser and examining same in appropriate test apparatus. This method yields questionable results because the simulated test condition is not the same as the in service condition. Specifically, dirt films which may be on the tubes can be removed in the handling process. Other changes from the in service tube condition may also result from dismantling them and mounting the dismantled tubes in the test apparatus. Additionally, with the above mentioned test it is usual to test one tube at a time and because more than one is required for representative sampling the process becomes time consuming, expensive and somewhat unsatisfactory.

The method proposed in the A.S.M.E. Power Test Code for steam condensing apparatus involves piping up as many as 30 tubes, from the condenser tube bank of the normally-sized condenser in a modern steam power plant, so that water flow and temperature rise for these individual tubes can be measured. The assumption that a substantial number of "test" tubes are representative of the condenser is open to some considerable doubt as not all tubes in the condenser are subject to the same steam pressure and therefore cannot perform in the same manner. In addition, it is impractical to attempt to measure local steam pressure within the tube banks. Furthermore, sampling can be done only by prearranged selections which are based on judgment and not quantitative heat transfer theory. Therefore, the correctness of the tubes selected to give a representative and accurate sample of condenser performance is always questionable. Also the assumption that the average performance of the selected tubes refers to an average of a number of arbitrary back pressure measurements is subject to serious error. This assumption that the average performance of the selected tubes refers to an average of arbitrary back pressure measurements is not necessarily and is not likely to be directly associated with the back pressure at each of the selected tubes within the condenser. In addition, the cost of piping each tube to the ouside of the condenser, providing special pumps and flow and temperature measuring instruments and the installation, teardown and test time make this method so costly it is seldom used.

The present invention overcomes the prior art defects mentioned above by incorporating a plurality of calorimeter tubes each strategically located in the condenser tube sheet, each calorimeter tube including means comprising a static tube, impact tube and thermocouple in combination with means for taking pressure measurements within the condenser in the general vicinity of each calorimeter tube, for determining the complete data necessary to calculate the actual heat transfer of each tube as a single tube so that this data can be compared with available laboratory data on new clean tubes in steam condensing environments. Such a comparison leads to a valid determination of the fouling resistance of the tubes in service. Two or more calorimeter tubes are located directly and without obstruction in the entrance steam flow path around the periphery of the condenser tube banks and so that they are free from condensate drainage from tubes above them. In such locations, while functioning as working tubes, they also perform as single tubes in the same manner as in a full scale laboratory calorimeter. Water flow rate and water temperature increase of the cooling water are measured by combination static pressure, dynamic pressure pitot tubes and thermocouples and local static steam pressure within the condenser can be measured in close proximity to the calorimeter tubes because of their exposed position and it is practical and feasible to do so. Such measurements of static pressure in the vicinity of the calorimeter tube may be accomplished by employing either well-known basket tipped pressure probes or static plates commonly used in the condenser art to measure pressure at various locations in the condenser. Because there is very little pressure change along the axis of a tube in a well designed condenser it is unlikely that more than one or two pressure measuring devices be employed. Furthermore as is well-known, measurement of the temperature of a condensing vapor is accomplished by measuring pressure since the vapor is at saturation and there is a pressure temperature relationship. It is simply a question of employing the physical law of the saturation pressure/temperature relationship. Thus complete and accurate data may be made available to determine the actual heat transfer of these tubes as calorimeter tubes.

Accordingly, it is an object of the present invention to provide an improved and reliable method and apparatus for determining the fouling resistance characteristics of condenser tubes.

It is a further object to provide working calorimeter tubes for a condenser which permits one to accurately determine the fouling resistance characteristics of the condenser tubes when in service, either cleaned or as being operated and representative of the condenser as a whole and unaffected by location, internal pressure losses and associated inconsistances in corresponding steam temperature.

Other objects and advantages of the invention including the basic design and the nature of the improvements thereon will appear from the following description taken in conjunction with the following drawings, in which:

FIGURE 3 is an enlarged section of the instrumentation of the working calorimeter tube.

FIGURE 4 is an enlarged partial section of the tip end of the instrumentation.

FIGURE 5 is a cross section taken on lines 5—5 of FIGURE 3.

FIGURE 6 is a cross section taken on lines 6—6 of FIGURE 4.

The drawings are to be understood to be more or less of a diagrammatic character for the purpose of illustrating and disclosing a typical or preferred form of the improvements contemplated herein and in the drawings like reference characters identify the same parts in the several views.

Figure 1:
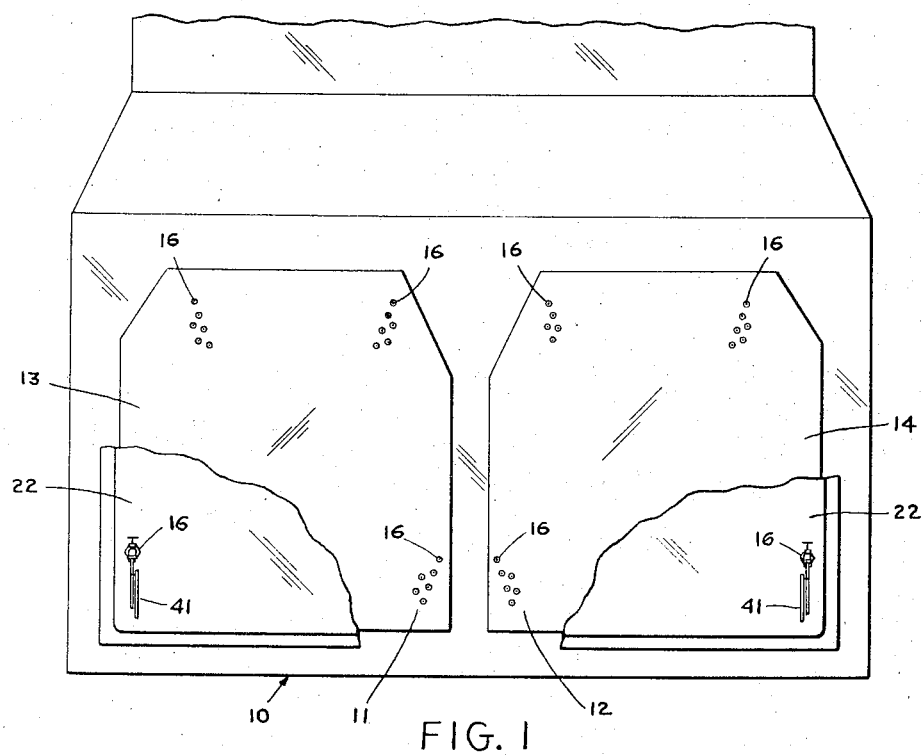
FIGURE 1 is a transverse section of a surface condenser showing the left hand and right hand tube banks mounted in their respective tubes sheets.

Referring to the exemplary embodiment of the invention in FIGURE 1 there is shown a surface condenser designated 10 comprising a left hand bank of tubes 11 and a right hand bank of tubes 12 mounted respectively in their tube sheets 13 and 14.

Figure 2:
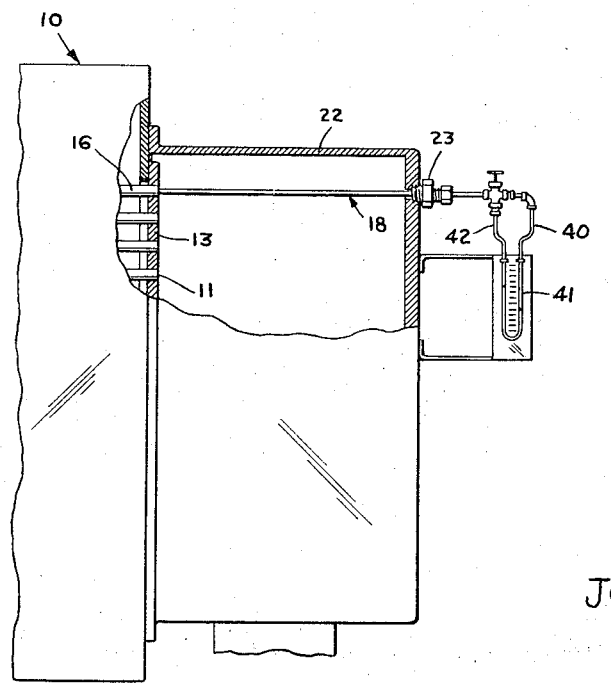
FIGURE 2 is a partial section of the working calorimeter tube also showing the instrumentation.

Now referring particularly to the working calorimeter tube 16 as is clearly shown in FIGURE 2; within the calorimeter tube 16 there is incorporated means, designated 18, for determining the fouling resistance characteristics of the condenser tubes. As was mentioned above at least 2 of these calorimeter tubes 16 each incorporating the means 18 and a pressure measuring means 19 for taking pressure measurements within the condenser in the general vicinity of each of the calorimeter tubes are mounted in the condenser as is clearly shown in FIGURES 1 and 2. As was mentioned hereinabove, each calorimeter tube 16 is mounted directly and without obstruction in the entrance steam flow path around the periphery of the condenser tube banks and so that they are free from condensate drainage from tubes above them.

While four of the calorimeter tube locations are shown it has been found that a minimum of two are required and more are useful in carrying out the concepts of the present invention provided they are relatively uniformly arranged and are in an unobstructed steam flow path, and accordingly it is not intended that the present invention be limited in this respect.

Now referring particularly to the means 18 in FIGURE 3 it comprises a tube generally designated 20 which operates as an impact tube and a static tube and a thermocouple or temperature sensing means 32 all mounted within calorimeter tube 16.

More specifically the means 18 comprises static tube 30 axially disposed in calorimeter tube 16 by a positioning guide 21 at one end and connected to the water box cover 22 by threaded stuffing box 23 at the other end. The static tube 30 is provided with an opening 24 at the inner end whereby cooling water may impinge thereon and the flow rate thereof measured by the tube operating in combination as an impact tube 31 which is axially disposed within static tube 30 so that the inner portion 27 thereof communicates with the opening 24.

Thermocouple 32 is located in the head end of the tube 30 and is disposed to measure the temperature of the water or other coolant passing through the tube.

Temperature measurement is accomplished by passing leads $L_1$ and $L_2$ through the annular space 28 formed between the static tube and impact tube and connecting these leads to the usual temperature indicating means.

Pressure measurements are taken by connecting one end of the impact tube 31 to one end 40 of the usual manometer 41. The other end 42 of the manometer being connected, as is shown in FIGURE 3 to annular space 25 and drilled passageway 29 in the head of the tube 30 provides an arrangement for sensing pressure in the condenser tube.

In operation the means incorporating an impact tube, static tube and thermocouple measures flow and outlet temperature of water flowing through the working calorimeter tubes and this data in combination with inlet water temperature and the pressure within the condenser in the general vicinity of each calorimeter tube taken at 19 provides complete data necessary to calculate the actual heat transfer of each tube as a single tube so that the data can be compared with available laboratory data on new clean tubes in condensing steam environments. Such a comparison leads to a valid determination of the fouling resistance of the tubes in service.

Although this invention has been described with reference to specific apparatus, it will be appreciated that a wide variety of changes may be made both in the apparatus and method without departing from the scope of this invention. For example, some of the components of the apparatus may be reversed, certain features of the invention may be used independently of others, and equivalents may be substituted for both the apparatus and method steps, all within the spirit and scope of the invention as defined in the appended claims.

What is claimed is:
1. The method of determining the fouling resistance characteristics of a condenser tube which comprises measuring the heat transfer of a reference tube selectively located in the condenser by, measuring the water flow and outlet temperature of water flowing through said reference tube, measuring the pressure in the condenser in the vicinity of said reference tube, and comparing the data determined with that of available data from laboratory calorimeters to obtain the fouling resistance characteristics.

2. The method of determining the fouling resistance characteristics of a condenser tube which comprises measuring the heat transfer of a plurality of reference tubes all selectively located in the condenser so that said reference tubes act as a single tube heat transfer unit by, measuring the water flow and outlet temperature of water flowing through each of said reference tubes, measuring the pressure in the condenser in the vicinity of each of the reference tubes, and comparing the data determined with that of available data from laboratory calorimeters to obtain the fouling resistance characteristics.

3. A working calorimeter tube for a condenser including a tube sheet having a plurality of tubes, said working calorimeter tube being disposed in said tube sheet and including means operatively connected therewith comprising fluid flow rate measuring means for measuring the fluid flow rate through said working calorimeter tube and a temperature sensing means for measuring the temperature of the fluid flowing in said working calorimeter tube to provide data to be used in determining the heat transfer of said working calorimeter tube, and means disposed within the condenser and in close relationship with said working calorimeter tube for measuring the pressure within the condenser in the vicinity of said calorimeter tube.

4. The combination claimed in claim 3 wherein at least two working calorimeter tubes are disposed in said tube sheet.

5. The combination claimed in claim 3 wherein said fluid flow rate measuring means comprises a static tube and an impact tube.

6. The combination claimed in claim 5 wherein the temperature sensing means comprises a thermocouple.

7. In a condenser having a tube sheet with a plurality of tubes, a calorimeter apparatus for determining the fouling resistance characteristics of said tubes comprising a plurality of working calorimeter tubes selectively disposed in said tube sheet, each of said working calorimeter tubes including means comprising a static tube and an impact tube for measuring the fluid flow rate within each of said working calorimeter tubes, and a thermocouple for measuring the temperature of the fluid in each of said working calorimeter tubes, and means for measuring the pressure within the condenser in the vicinity of each of said working calorimeter tubes.

8. A working calorimeter tube for a condenser including a tube sheet having a plurality of tubes, said working calorimeter tube being disposed in said tube sheet and comprising a first tube having means therein for measuring the static pressure of the fluid in the working calorimeter tube, a second tube disposed within said first tube, said second tube operative as an impact tube to measure the total pressure of the fluid within the working calorimeter tube, and a thermocouple disposed in said first tube for sensing the temperature of the fluid within said working calorimeter tube, and static pressure measuring means disposed within said condenser and in close relationship with said working calorimeter tube for measuring the pressure within the condenser in the vicinity of said working calorimeter tube.

References Cited by the Examiner

UNITED STATES PATENTS 1,917,810   7/1933   Reynoldson _____ 73—343.5

OTHER REFERENCES

Guske, E. J., et al.: Abandoned patent application Ser. No. 730,098, filed Feb. 21, 1947, entitled "Pressure and Temperature Sensing Device." Abstract published 673 O.G. 836, Aug. 18, 1953.

RICHARD C. QUEISSER, *Primary Examiner.*

J. C. GOLDSTEIN, *Assistant Examiner.*